(12) United States Patent
John et al.

(10) Patent No.: US 7,616,624 B2
(45) Date of Patent: Nov. 10, 2009

(54) DETERMINING USER AVAILABILITY BASED ON THE EXPECTED DURATION OF A NEW EVENT

(75) Inventors: Ajita John, Holmdel, NJ (US); Doree Duncan Seligmann, New York, NY (US)

(73) Assignee: Avaya Inc., Basking Ridge, NJ (US)

( * ) Notice: Subject to any disclaimer, the term of this patent is extended or adjusted under 35 U.S.C. 154(b) by 67 days.

(21) Appl. No.: 11/458,751

(22) Filed: Jul. 20, 2006

(65) Prior Publication Data

US 2008/0019292 A1    Jan. 24, 2008

(51) Int. Cl.
H04L 12/66    (2006.01)
(52) U.S. Cl. ....................... 370/352; 709/204
(58) Field of Classification Search ............... 379/88.17, 379/201.1, 265, 93.28, 93.29, 93.31; 370/352; 709/204
See application file for complete search history.

(56) References Cited

U.S. PATENT DOCUMENTS

| | | | |
|---|---|---|---|
| 5,960,173 A * | 9/1999 | Tang et al. .................. 709/201 |
| 6,295,353 B1 * | 9/2001 | Flockhart et al. ........ 379/265.02 |
| 6,938,213 B2 * | 8/2005 | Brown et al. ................. 715/758 |
| 6,990,353 B2 | 1/2006 | Florkey et al. |
| 2002/0116461 A1 | 8/2002 | Diacakis et al. |
| 2005/0198321 A1 | 9/2005 | Blohm |
| 2006/0059568 A1 * | 3/2006 | Smith-Mickelson et al. .. 726/27 |

* cited by examiner

Primary Examiner—Curtis Kuntz
Assistant Examiner—Yosef K Laekemariam
(74) Attorney, Agent, or Firm—DeMont & Breyer, LLC

(57) ABSTRACT

Techniques are disclosed for determining, for each candidate communication medium, the availability of one or more telecommunications endpoint users for participating in a communication session of interest (i.e., either new or existing) via the evaluated medium. In accordance with the illustrative embodiment of the present invention, an availability manager determines the availability based on (i) one or more discrete rules, or (ii) one or more continuous functions, or both. The continuous functions are specified with respect to the time that has elapsed since a previous session, the time remaining in an active session, and the expected duration of a new session. Once it has determined the availability of one or more participants in the communication session, the availability manager of the illustrative embodiment transmits one or more signals to a call-processing server, which then sets up the participants on the session via the appropriate communication medium such as voice, instant messaging, and so forth.

18 Claims, 8 Drawing Sheets

DETERMINING USER AVAILABILITY BASED ON THE EXPECTED DURATION OF A NEW EVENT

FIELD OF THE INVENTION

The present invention relates to telecommunications in general, and, more particularly, to determining the availability of one or more users (i.e., of telecommunications endpoints).

BACKGROUND OF THE INVENTION

In promoting collaborative efforts in a fast-paced environment such as a business enterprise, there is a growing need to bring together, in an automated fashion, the right group of people at the most appropriate time—and often at the spur of the moment. Collaboration is often required to resolve pending issues in a variety of situations—for example, routine situations such as the ordering of items in an inventory and the resolution of claims in an insurance company, life-critical situations such as bringing hospital staff together for an emergency consultation, and time-critical situations such as responding to stock market changes in a brokerage firm. The advantage in being able to connect people in an automated fashion and in response to enterprise events is the reduced delay in making a decision, which leads to greater enterprise productivity.

One challenge in bringing a group of people together is ensuring that the specific roles that are needed in the collaboration are, in fact, represented. For example, the roles in an enterprise's research and development organization might include a researcher, a systems engineer, an architect, a developer, a tester, a project manager, and so forth. What heightens the challenge is that the people performing these roles might not all be at the same location, might be using different kinds of communication media (e.g., voice, instant messaging, etc.) at their various telecommunications endpoints (e.g., telephones, computers, personal digital assistants, etc.), might be in different environments (e.g., office, car, airport, home, etc.), and might already be participating in one or more communication sessions such as telephone calls. Additionally, there might be several people that can perform each role, making it necessary to be able to select a person to perform each given role. In any event, it is necessary to determine the availability of each person for participating in the collaboration, which is often in the form of a new communication session that is to occur via a particular communication medium. In this context, a person's availability is characterized in terms of that person's ability to participate in a specified communication session, via a specified communication medium and at a specified time.

Another challenge in bringing a group of people together, particularly in a global enterprise, is dealing with information that is often non-uniform and incomplete. People must often be brought together quickly to smooth over and fill in the information. Accordingly, the need to be able to compute availability increases as enterprises become more global and complex. And as those enterprises grow and evolve, they need to extend their reach and to increase the resource pool from which to select people (e.g., for contact centers, etc.). Furthermore, those enterprises often need to automate communications as part of their expanding business processes (e.g., supply chain management, emergency management, etc.).

What is needed is a technique to determine the availability of a person for participating in a collaboration or other event, such as in a new or an existing communication session via a telecommunications endpoint, without some of the disadvantages in the prior art.

SUMMARY OF THE INVENTION

The present invention enables the determination, across a range of communication media and endpoints, of an individual's or a group's availability based on roles and other constraints, in order to select which communication medium is best to use for a group conference, among other purposes. For each candidate communication medium, the techniques of the illustrative embodiment are able to determine the availability of one or more telecommunications endpoint users, without some of the disadvantages in the prior art, for participating in a communication session of interest (i.e., either new or existing) via the medium. In accordance with the illustrative embodiment of the present invention, an availability manager determines the availability based on (i) one or more discrete rules, or (ii) one or more continuous functions, or both. Once it has determined the availability of one or more participants in the communication session, the availability manager of the illustrative embodiment transmits one or more signals to a call-processing server, which then sets up the participants on the session via the appropriate communication medium such as voice, instant messaging, and so forth.

The availability manager of the illustrative embodiment is capable of determining the availability of an endpoint user for participating in a new or existing communication session at a telecommunications endpoint via a particular communication medium, based on one or more discrete rules that specify availability conditions. These rules can be either user-specified or system-specified, and can be stored and maintained at database servers. The following are examples of discrete availability rules:

i. If user X is on a voice call, availability for a new or existing communication session is zero (i.e., non-existent).

ii. If user X is on fewer than N (e.g., three, etc.) instant messaging sessions, availability for a new session is equal to 10 on a scale of 0 through 10 (i.e., high).

iii. If user X is on N or more instant messaging sessions, availability for a new session is zero.

iv. User X will accept a call if it is on subject Y.

The availability manager is also capable of determining the availability of the endpoint user for participating in a new or existing communication session at a telecommunications endpoint via a particular medium, based on one or more continuous functions. In accordance with the illustrative embodiment of the present invention, the availability manager uses continuous functions for certain availability conditions, such as conditions that are based on the time that has elapsed since a previous session, the time remaining in an active session, the expected duration of a new session, and so forth. The particular continuous function that the availability manager uses is based, at least in part, on whether the user whose availability is being determined is currently active in at least one communication session or not.

If the user is currently not participating in any communication session (i.e., is inactive), the availability manager calculates the availability of the user based on the difference between the present time and an earlier time at which the user performed an action or at which the system performed a user-affecting action. Such an action can include the user hanging up on a session, the session itself ending, the user unsuccessfully attempting to call someone else, and so forth. In accordance with the illustrative embodiment, if a user's participation in a communication session at an endpoint ended at time $t_1$, it can be assumed that the user was highly available at the endpoint immediately after the participation ended. The availability of the user at that endpoint at time $t_2$, where $t_2$ is later than $t_1$, is defined as an exponential decay that is a function of the availability at $t_1$.

When the user is currently participating on at least one communication session (i.e., is active), the availability manager calculates the availability of the user based on one or both of: (i) the expected duration of the communication session of interest for which the user's availability is being determined; and (ii) the expected times remaining in each of the communication sessions in which the user is currently active. In one sense, the availability manager assesses the "interruptibility" of the user for when the user is already participating in at least one communication session. Similar to how availability is determined for a currently inactive user, the availability of a currently active user for an additional communication session is defined as one or more exponentially decaying functions of time.

In accordance with the illustrative embodiment, the availability manager is further capable of determining the availability of a group of users for a communication session of interest, in the process considering one or more candidate communication media. The group can be one that is ad hoc (e.g., a temporary task force, etc.) or one that was pre-existing (e.g., a team that has been meeting on a regular basis, etc.). The availability manager calculates a group availability index in order to select the most appropriate communication medium for connecting an endpoint-user group. The user group itself might consist of a different mix of members for each communication medium being considered. In some alternative embodiments, the medium is fixed in advance, and the availability manager selects the people that have the highest availability on the fixed medium that is required for a communication session, such as a conference call.

The techniques of the illustrative embodiment address determining user availability and are advantageous over some techniques in the prior art. Some prior art techniques monitor user-specified availability settings and infer a user's availability from those settings; however, this can result in erroneous conclusions, such as when a user sets an indication to let others know that she is at her desk but then walks away from her desk without remembering to update the indication. Some other prior art techniques monitor desktop activity (e.g., keystrokes, mouse clicks, etc.) and infer a user's availability from the activity; however, this also can result in erroneous conclusions, such as when a user momentarily walks away from his desk and someone else resumes typing at the user's desktop. In either prior art scenario, an Instant Messaging (IM) client, for example, might indicate that the user is present when, in fact, she or he is not. The techniques of the illustrative embodiment attempt to sidestep the shortcomings in the prior art by inferring the user availability directly, instead of by inferring the user availability indirectly with unreliable data.

The illustrative embodiment of the present invention comprises: determining an availability of a user for participating in a communication session of interest, wherein the availability is based on an exponential decay that is a function of the expected duration of the communication session of interest.

DETAILED DESCRIPTION

Figure 1:
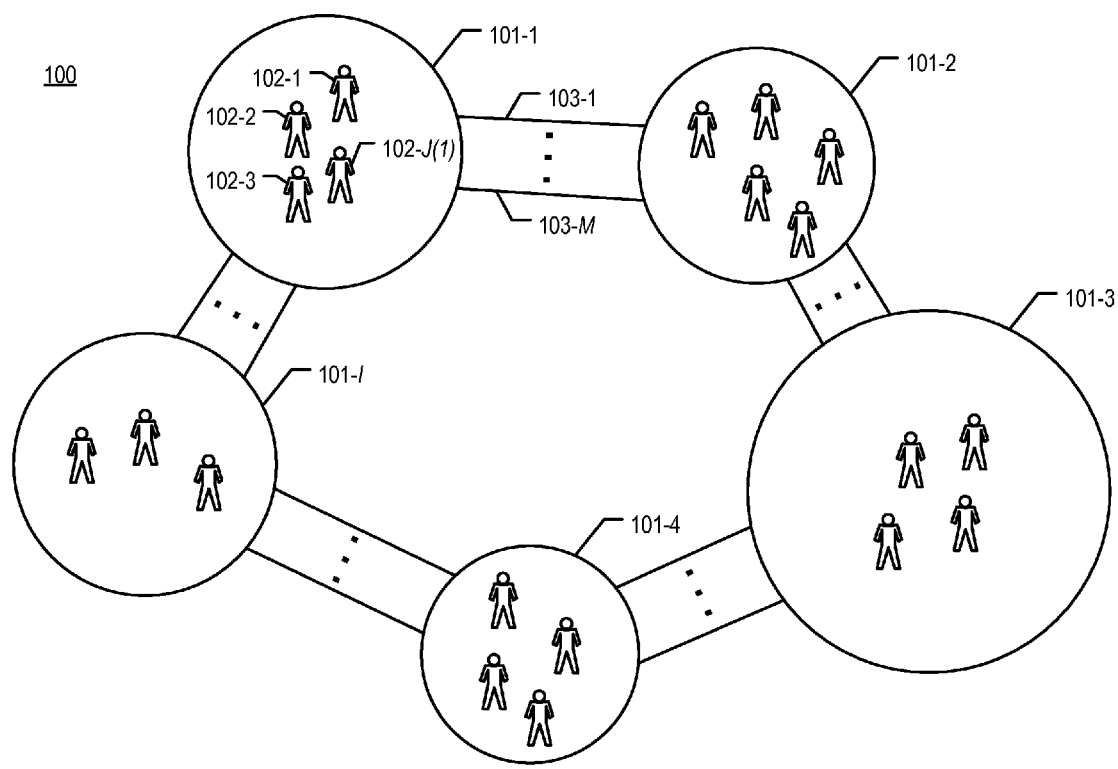
FIG. 1 depicts the problem of bringing a group of people together.

Given (i) a group of selected people, G: {U1, U2, . . . , UI}, where each person, Ui, in the group is an telecommunications endpoint user, and (ii) a set of communication media {Voice, Instant Messaging, Web, . . . } that are accessible by the endpoints, one can determine, for a particular time and based on each user's availability, the most appropriate people to participate in a communication session and the most appropriate communication medium to use. Additionally, it might be more important to include in the session certain roles, as performed by the participants, as opposed to other roles. In fact, the overall problem of bringing a group of people together is illustrated in FIG. 1, where each circle represents a different role to be performed—that is, roles 101-1 through 101-I-by a user in each pool of users—that is, users 102-1 through 102-J(i) for role 101-i—where I and J(i) are positive integers. The size of each circle is a representation of the corresponding role's importance, and the connections represent the different communication media—that is, media 103-1 through 103-M—that can be used to connect the users, where M is a positive integer.

Figure 2:
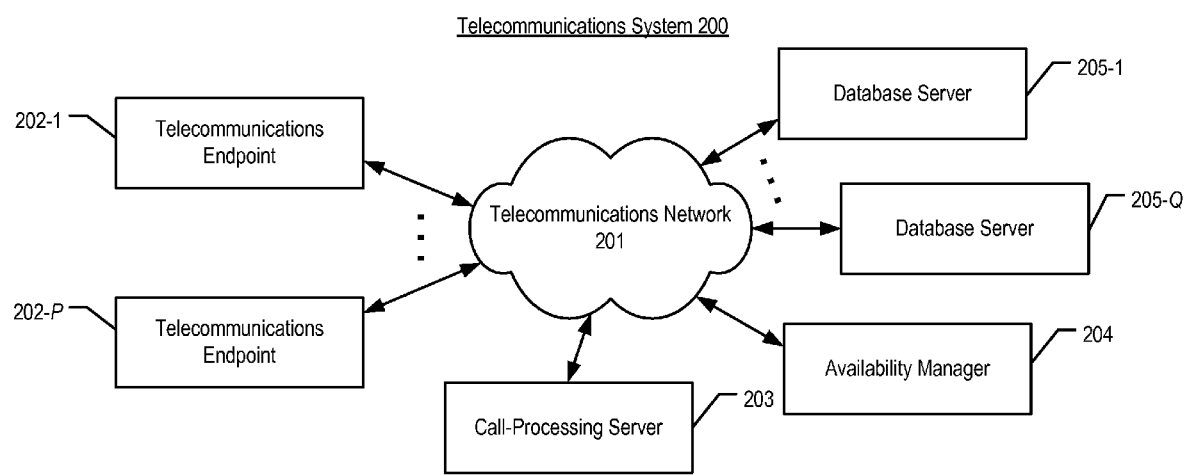
FIG. 2 depicts telecommunications system 200 in accordance with the illustrative embodiment of the present invention.

FIG. 2 depicts telecommunications system 200 in accordance with the illustrative embodiment of the present invention. Telecommunications system 200 comprises telecommunications network 201; telecommunications endpoints 202-1 through 202-P, wherein P is a positive integer; call-processing server 203; availability server 204; and database servers 205-1 through 205-Q, wherein Q is a positive integer—the depicted elements of system 200 being interconnected as shown. Telecommunications system 200 is capable of both packet-based and circuit-based switching and transmission of media signals (e.g., voice, video, text, etc.), as is well-known in the art. However, it will be clear to those skilled in the art, after reading this specification, how to apply the present invention to alternative embodiments with all packet-based switching and transmission or all circuit-based switching and transmission.

Telecommunications network 201 is a telecommunications network that comprises one or more of the Internet, the Public Switched Telephone Network (PSTN), and so forth. Network 201 comprises or is connected to one or more transmission-related nodes such as gateways, routers, or switches that are used to direct data packets from one or more sources to the correct destinations of those packets.

Telecommunications endpoint 202-$p$, for $p=1$ through P, is a communications device such as a Plain Old Telephone Service (POTS) telephone, a softphone, an Internet Protocol-based endpoint, a Session Initiation Protocol-based endpoint, a notebook computer, a personal digital assistant (PDA), a tablet computer, and so forth. Each endpoint is capable of originating outgoing communication sessions and receiving incoming communication sessions, in well-known fashion. In addition, each endpoint is capable of communicating via one or more communication media that comprise, but are not limited to voice, audio, video, data, email, instant messaging, other text-based messaging, web, and chat. As those who are skilled in the art will appreciate, in some embodiments endpoints 202-1 through 202-P are capable of handling differing combinations of media, while in some other embodiments the endpoints are all capable of handling the same combination of media. It will be clear to those skilled in the art how to make and use telecommunications endpoints 202-1 through 202-P.

Call-processing server 203 is a data-processing system that handles call-processing requests from its telecommunications endpoint users, as well as from other users. In handling voice sessions, server 203 reads in and analyzes the dialed digits from telecommunications endpoint 202-$p$, and processes the corresponding call-setup request. In handling instant-messaging sessions, server 203 receives text-based messages from users and routes those messages to the specified recipients. Server 203 also tracks the "presence" of each user, as is known in the art, at the endpoints and on the various communication media. Call-processing server 203 is also capable of receiving, from availability manager 204, requests to set up endpoints on communication sessions. In some other alternative embodiments, server 203 is capable of providing user, endpoint, session, or media status indications to availability manager 204.

Although a single call-processing server is depicted, it will be clear to those skilled in the art, after reading this specification, how to make and use alternative embodiments of the present invention with multiple call-processing servers present—for example, a first server for voice, a second server for instant messaging, and so forth. In any event, it will be clear to those skilled in the art how to make and use call-processing server 203.

Availability manager 204 is a server data-processing system that determines the availability of various telecommunications endpoint users to participate in communication sessions via various communication media, and is depicted in additional detail below and with respect to FIG. 3. Availability manager 204 is capable of accessing database servers 205-1 through 205-Q for the purpose of acquiring one or more rules that specify availability conditions and is capable of receiving indications of the status of users, endpoints, sessions, and media, from the other devices in system 200. In the illustrative embodiment, availability manager 204 operates in accordance with the Internet Protocol for the purpose of transmitting and receiving information. In some alternative embodiments, as those who are skilled in the art will appreciate, availability manager 204 can operate in accordance with a different protocol.

In accordance with the illustrative embodiment, availability manager 204 determines the availability of endpoint users based on the rules and indications that it receives from one or more sources. The details of this process are described below and with respect to FIGS. 4 through 8. As those who are skilled in the art will appreciate, the functionality described in this specification with respect to availability manager 204 can alternatively be implemented in a data-processing system that is other than a server. In some other embodiments, the availability manager functionality might be co-located with other functionality, such as the database functionality or the call-processing functionality. In any event, it will be clear to those who are skilled in the art, after reading this specification, how to make and use availability manager 204.

Database server 205-$q$, for $q=1$ through Q, is a data-processing system that fulfills database access requests from its users. Each database server is capable of acquiring and maintaining availability rules. In some embodiments, each database server stores a different set of availability rules; for example, server 205-1 might store the rules for one set of users, while server 205-2 stores the rules for another set of users, and so forth. In some other embodiments, the database functionality might be co-located with other functionality, such as the availability manager functionality or the call-processing functionality. It will be clear to those skilled in the art how to make and use database servers 205-1 through 205-Q.

Figure 3:
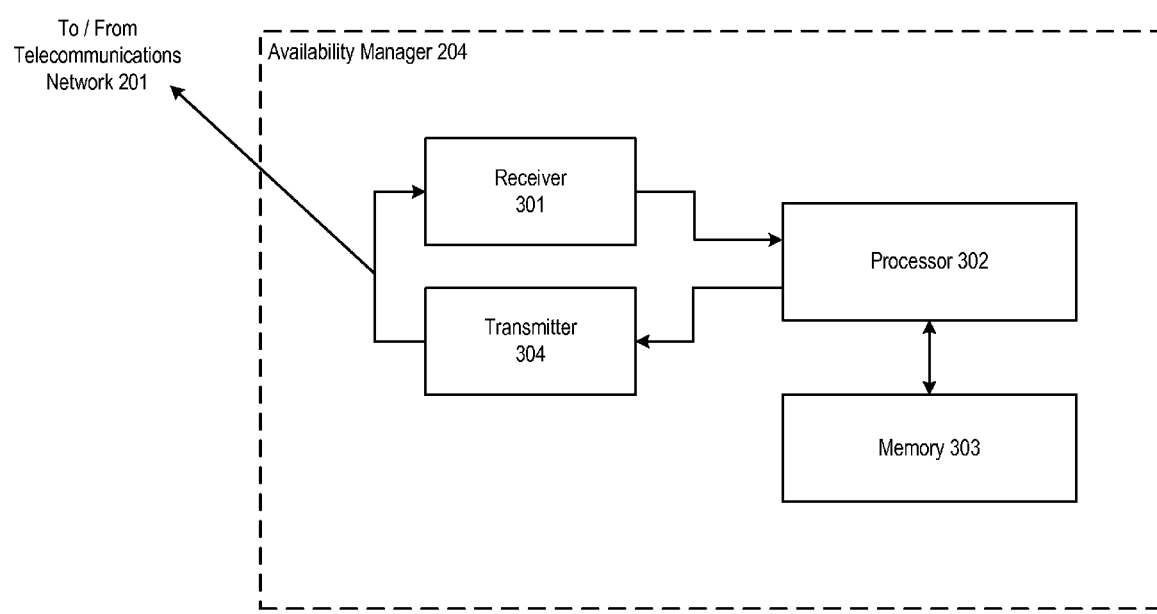
FIG. 3 depicts the salient components of availability manager 204 in system 200.

FIG. 3 depicts the salient components of availability manager 204 in accordance with the illustrative embodiment of the present invention. Manager 204 comprises receiver 301, processor 302, memory 303, and transmitter 304, interconnected as shown.

Receiver 301 receives signals from other nodes (e.g., telecommunications endpoint 202-$p$, call-processing server 203, database server 205-$q$, etc.) via network 201 and forwards the information encoded in the signals to processor 302, in well-known fashion. It will be clear to those skilled in the art, after reading this specification, how to make and use receiver 301.

Processor 302 is a general-purpose processor that is capable of receiving information from receiver 301, executing instructions stored in memory 303, reading data from and writing data into memory 303, executing the tasks described below and with respect to FIGS. 4 through 8, and transmitting information to transmitter 304. In some alternative embodiments of the present invention, processor 302 might be a special-purpose processor. In either case, it will be clear to those skilled in the art, after reading this specification, how to make and use processor 302.

Memory 303 stores the instructions and data used by processor 302. Memory 303 might be any combination of dynamic random-access memory (RAM), flash memory, disk drive memory, and so forth. It will be clear to those skilled in the art, after reading this specification, how to make and use memory 303.

Transmitter 304 receives information from processor 302 and transmits signals that encode this information to other nodes (e.g., telecommunications endpoint 202-$p$, call-processing server 203, etc.) via network 201, in well-known fashion. It will be clear to those skilled in the art, after reading this specification, how to make and use transmitter 304.

Figure 4:
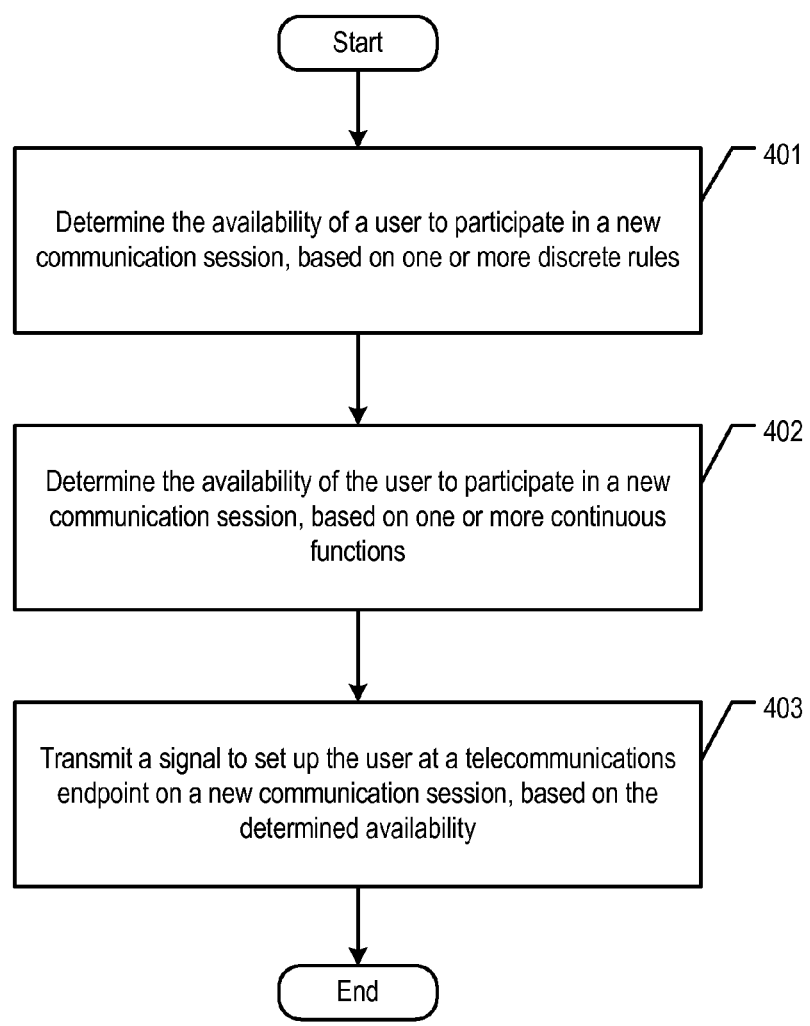
FIG. 4 depicts a flowchart diagram of the salient tasks performed by availability manager 204 in determining the availability of a user to participate in a communication session of interest at a telecommunications endpoint, in accordance with the illustrative embodiment of the present invention.
Figure 5:
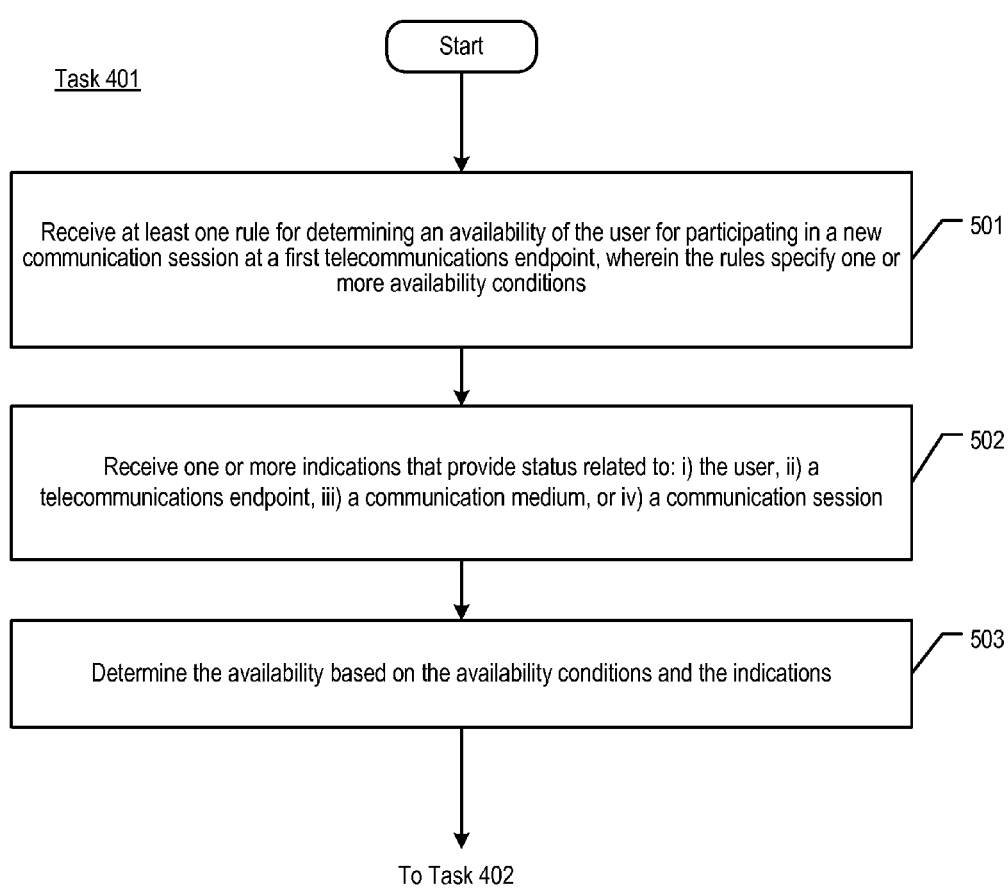
FIG. 5 depicts a flowchart diagram of the salient tasks performed by availability manager 204 in determining the availability of a user, based on one or more discrete rules.
Figure 6:
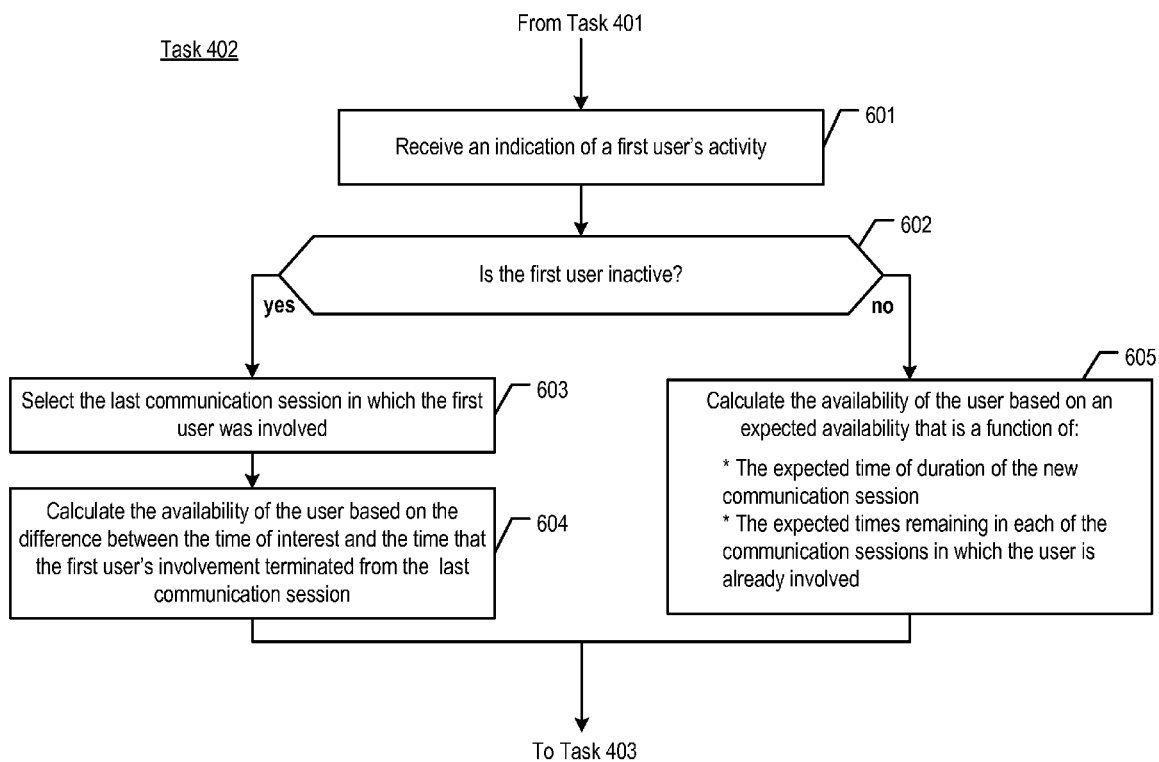
FIG. 6 depicts a flowchart diagram of the salient tasks performed by availability manager 204 in determining the availability of a user, based on one or more continuous functions.

FIGS. 4 through 6 depict flowchart diagrams of the salient tasks for determining the availability of a user of interest for participating in a communication session of interest (i.e., either a new or an existing session) via a communication medium of interest. As those who are skilled in the art will appreciate, some of the events that appear in FIGS. 4 through 6 can occur in parallel or in a different order than that depicted. Furthermore, it will be clear to those skilled in the art, after reading this specification, how to apply the present invention towards determining other types of user availability, such as the availability of an endpoint user, or a person in general, to perform a task or to do other work. For pedagogical purposes, the availability is determined in the illustrative embodiment is expressed in terms of a value between 0 and 10, where "0" signifies that availability is non-existent, "1" signifies the lowest, existing availability, and "10" signifies the highest availability. As those who are skilled in the art will appreciate, however, availability can be evaluated and expressed in terms of other scales, such as "between 0 and 1"; "none", "low", "medium", or "high"; and so forth.

FIG. 4 depicts a flowchart diagram of the salient tasks performed by availability manager 204 in determining the availability of a user to participate in a communication session of interest at a telecommunications endpoint, in accordance with the illustrative embodiment of the present invention. In accordance with the illustrative embodiment, manager 204 can determine the availability of any of the users of telecommunications endpoints 202-1 through 202-P. Note that each endpoint user can be active in one or more sessions, where some of the users might be on the same session or session, or can be inactive (i.e., not involved in any session).

At task 401, manager 204 determines the availability of a user for participating in a communication session of interest at a telecommunications endpoint via a particular communication medium, based on one or more discrete rules that specify availability conditions. These rules can be either user-specified or system-specified and are stored at database servers 205-1 through 205-Q. The following are examples of discrete availability rules:

i. If user X is on a voice call, availability for a new or an existing communication session is zero (i.e., non-existent).

ii. If user X is on fewer than N (e.g., three, etc.) instant messaging sessions, availability for a new session is equal to 10 on a scale of 0 through 10 (i.e., high).

iii. If user X is on N or more instant messaging sessions, availability for a new session is zero.

iv. User X will accept a call if it is on subject Y.

Task 401 is described in detail below and with respect to FIG. 5.

At task 402, manager 204 determines the availability of a user for participating in a communication session of interest at a telecommunications endpoint via a particular medium, based on one or more continuous functions. In accordance with the illustrative embodiment of the present invention, manager 204 uses continuous functions for certain availability conditions, such as conditions that are based on the time that has elapsed since a previous session, the time remaining in an active session, the expected duration of a new session, and so forth. Task 402 is described in detail below and with respect to FIG. 6.

At task 403, manager 204 sets up the user on the communication session of interest at his or her telecommunications endpoint, based on the availability determined at task 401 or task 402, or both. To set up the user, manager 204 transmits a signal to instruct call-processing server 203 to set up the corresponding endpoint on the communication session of interest on the selected communication medium. In some alternative embodiments, manager 204 can directly transmit call setup instructions (e.g., a SIP INVITE, etc.) to the corresponding endpoint. It will be clear to those skilled in the art how to set up a communication session, once the determination has been made to set up the user on a particular endpoint and on a particular medium.

FIG. 5 depicts a flowchart diagram of the salient tasks performed by availability manager 204 in determining the availability of a user to participate in a communication session of interest (i.e., either a new or an existing session) at a telecommunications endpoint, based on one or more discrete rules and in accordance with the illustrative embodiment of the present invention.

At task 501, manager 204 receives one or more rules, from one or more of database servers 205-1 through 205-Q, to be used for determining the availability of the user of interest for participating in a communication session of interest at a first endpoint. The received rule or rules specify one or more availability conditions, as described above and with respect to task 401. As a first example, an availability condition can be based on the number of communication sessions that are already occurring in which the user is involved (i.e., on which the user's endpoint has been set up). As a second example, an availability condition for a particular user can be based on one or more communication sessions occurring via a first medium, such as voice, while another availability condition for that particular user might be based on one or more communication sessions occurring via a second medium, such as instant messaging.

At task 502, manager 204 receives one or more indications—for example, from call-processing server 203—that provide status related to: i) the user; ii) a telecommunications endpoint (e.g., that of the user, that of another user, etc.); iii) a communication medium (e.g., that through which an endpoint is communicating, etc.); or iv) a communication session (e.g., one involving an endpoint, etc.). As a first example, manager 204 can receive an indication that the user is involved in a first communication session and at a particular endpoint. As a second example, manager 204 can receive an indication of the expected times remaining in one or more communication sessions. As a third example, manager 204 can receive an indication that a communication session is occurring via a particular communication medium. And as a fourth example, manager 204 can receive one or more indications that specify that a user is involved in multiple sessions, either all on the same medium or on different media. As those who are skilled in the art will appreciate, other information can be conveyed to and used by manager 204 to be used in determining availability.

At task 503, manager 204 determines the availability based on some or all of the received availability conditions and some or all of the received indications. For example, suppose a rule specifies that "if user X is on fewer than three instant messaging sessions (i.e., the communication medium), availability for a new session is equal to 10 out of a scale from 0 to 10,"; if the received indications indicate that user X is on two instant messaging sessions, then manager 204 determines that the availability is equal to 10. Manager 204 can determine availability with respect to using a particular medium, regardless of whether the user is already in a session via the medium, was in a session via the medium, or has not yet been involved in a session via the medium of interest.

After task 503, task execution proceeds to task 402 to determine the availability of the user of interest, based on continuous functions. In some alternative embodiments, however, task execution bypasses task 402 and proceeds directly to task 403 instead.

FIG. 6 depicts a flowchart diagram of the salient tasks performed by availability manager 204 in determining the availability of a user to participate in a communication session of interest (i.e., either a new or an existing session) at a telecommunications endpoint, based on one or more continuous functions and in accordance with the illustrative embodiment of the present invention. The continuous functions that are used in the illustrative embodiment are specified relative in time to one or more communication sessions that are pertinent to the user, and are used to determine the user's availability for participating in the communication session of interest. Those who are skilled in the art, after reading this specification, will appreciate that the continuous functions can be made relative in time, in some alternative embodiments, to other types of events that are pertinent to the user, in order to determine the user's availability for participating in a new event. For example, a person might have ended her participation in an event that is not necessarily a communication session (e.g., an in-person staff meeting, etc.)—in which case, the present invention can be applied to determine her availability, based on the ended event, for participating in a new event that is not necessarily a communication session (e.g., a group lunch, etc.).

At task 601, manager 204 receives a user-related indication. For example, manager 204 can receive, from call processing server 203, an indication that a user is active in one or more communication sessions.

At task 602, manager 204 checks whether the user of interest is active or not—that is, whether the user is or is not presently participating in any communication sessions. For example, manager 204 can check the received indication to determine user activity. If the user is inactive, task execution proceeds to task 603. If the user is active in at least one session, task execution proceeds to task 605.

At task 603, manager 204 selects the last communication session in which the user of interest was involved. Manager 204 can determine the session of interest by checking the call records of the user of interest.

At task 604, manager 204 calculates the availability of the user based on the difference between the present time and an earlier time at which the user performed an action at the endpoint. Alternatively, the difference can be between the present time and an earlier time at which a user-affecting action was performed. For example, the action might be the user hanging up on a session, the user being dropped from a session, the session itself ending, the user unsuccessfully attempting to call someone else, and so forth. The action can be manifested through the detection (e.g., by call-processing server 203, etc.) of a user input at the user's endpoint or of some other user-affecting event. The action that is featured in the illustrative embodiment is the ending of the user's involvement with the communication session that was selected as task 603, where an indication is received that the participation of the user in the session has finished.

In accordance with the illustrative embodiment, if a user's participation in a communication session at an endpoint ended at time $t_1$, it can be assumed that the user was highly available at the endpoint immediately after the participation ended. The inferred availability, $A_{inferred}$, of the user at that endpoint at time $t_2$, where $t_2$ is later than $t_1$, is defined as an exponential decay that is a function of the availability at $t_1$, as shown in the following equation:

$$A_{inferred} = A(t_1) * e^{-b*(t_2-t_1)} \quad \text{(Eq. 1)}$$

where:
i. b is the rate of decay (i.e., the decay constant) of the availability, and
ii. A(t) is an availability distribution in the system over time.

Although the availability of the user in the illustrative embodiment is based on an exponential decay function, in some alternative embodiments the availability of the user can be based on another type of function that is a function of the availability at $t_1$ or on another type of function that is a function of the difference between $t_2$ and $t_1$, as those who are skilled in the art will appreciate.

Furthermore, as those who are skilled in the art will appreciate, the value of the decay constant can be based on, but not limited to, one or more of the following:
i. the user,
ii. the user group of which the user is a member,
iii. the user's endpoint (e.g., the endpoint's degree of mobility, etc.),
iv. the medium for which availability is being determined, and
v. the time and date for which availability is being determined.

For example, if a user exhibits a behavior that results in her availability decreasing rapidly after the session has ended, a first value for the decay constant can be applied; however, if a second user exhibits a behavior that results in his availability decreasing slowly, a second value for the decay constant can be applied. The particular value can be determined analytically, empirically, or though other means.

The availability distribution, A(t), accounts for the fact that the user's underlying availability can vary as a function of time. For example, a user's availability exactly when the user's participation in a session ends at 9:00 AM might be 10 out of 10, while the same user's availability exactly when the user's participation in a session ends at 3:00 PM might be only 2 out of 10, and is accounted for by the appropriate curve for A(t). In some alternative embodiments, A(t) is independent of time.

Note that for a particular user, there might be several endpoints that support the same medium. In some embodiments, manager 204 calculates, for each of those endpoints and according to Equation 1, the availability of the user based on: (i) the last communication session on each endpoint and (ii) the rate of decay associated with each endpoint. Consider that although the user might have used a first endpoint (e.g., her desktop, etc.) after she had used a second endpoint (e.g., her PDA, etc.), the different rates of decay for the two endpoints might be such that the second endpoint ends up with a higher calculated availability than the first endpoint. Manager 204 then selects the endpoint with the highest availability.

Continuing with the task execution, after task 604 is completed task execution proceeds to task 403.

At task 605, which applies when the user is currently active on at least one communication session, manager 204 calculates the availability of the user based on one or both of: (i) the expected duration of the communication session of interest for which the user's availability is being determined; and (ii) the expected times remaining in each of the communication sessions in which the user is currently active. In one sense, manager 204 assesses the "interruptibility" of the user for when the user is already participating in at least one communication session.

The inferred availability, $A_{inferred}$, of the user for a communication session of interest beginning at time t is defined as one or more exponentially decaying functions of time, as shown in the following equation:

$$A_{inferred} = A(t) * (e^{-b_{new}*T_{new}} + e^{-b_2*T_2} + \ldots + e^{-b_N*T_N})  \quad \text{(Eq. 2)}$$

where:
i. $b_{new}$ is the rate of decay that applies to the user in the communication session of interest;
ii. $T_{new}$ is the expected duration of the communication session of interest;
iii. N is the number of active sessions in which the user is participating;
iv. $b_1$ through $b_N$ are the rates of decay that apply to the user in active communication sessions 1 through N, respectively;
v. $T_1$ through $T_N$ are the expected times remaining in active communication sessions 1 through N, respectively, relative to time t; and
vi. A(t) is an availability distribution in the system over time.

The expected duration of the communication session of interest, $T_{new}$, can be obtained or derived from any of a variety of sources, including an appointment calendar that shows the scheduled communication session of interest and allotted time, historical information about similar sessions such as regularly-scheduled conference calls, context-aware rules, Bayesian belief networks or systems, and so forth. As those who are skilled in the art will appreciate, $T_{new}$ can also be obtained or derived from other sources than those listed.

As can be seen in Equation 2, a longer expected duration of the communication session of interest ($T_{new}$) has the effect of lessening the availability of the user, and vice-versa. As can also been seen, a longer expected time remaining in the nth active communication session ($T_n$) also has the effect of lessening the availability of the user, and vice-versa. Furthermore, each active session in addition to the nth session further reduces the user's availability for the communication session of interest.

The active communication sessions can be occurring via the same medium or can be occurring via multiple media. Furthermore, the communication session of interest can occur via the same medium as some or all of the active sessions, or via a different medium. Since the sum of the terms of the active sessions evaluates to the same value regardless of the medium for the new session, $A_{inferred}$ will evaluate to different values for different candidate media based only on the $e^{-b_{new}*T_{new}}$ term.

Although the availability of the user in the illustrative embodiment is based on one or more exponential decay functions, in some alternative embodiments the availability of the user as derived from the expected time of duration of the communication session of interest can be based on a non-exponential function and the availability of the user as derived from the expected times remaining in the active sessions can be based on non-exponential functions, as those who are skilled in the art will appreciate.

Furthermore, as those who are skilled in the art will appreciate, the value of each decay constant can be based on, but not limited to, one or more of the following:
i. the user,
ii. the user group of which the user is a member,
iii. the user's endpoint (e.g., the endpoint's degree of mobility, etc.),
iv. the medium for which availability is being determined,
v. the time and date for which availability is being determined,
vi. the active communication session that corresponds to each decay constant,
vii. the medium of the corresponding, active communication session, and
viii. the communication session of interest.

For example, if a user exhibits a behavior that results in her availability decreasing rapidly after the new session has started, a first value for the decay constant can be applied; however, if a second user exhibits a behavior that results in his availability decreasing slowly, a second value for the decay constant can be applied. The particular value can be determined analytically, empirically, or though other means.

The availability distribution, A(t), accounts for the fact that the user's underlying availability can vary as a function of time. For example, a currently-inactive user's availability exactly at 9:00 AM might be 10 out of 10, while the same currently-inactive user's availability exactly at 3:00 PM might be only 2 out of 10, and is accounted for by the appropriate curve for A(t). In some alternative embodiments, the underlying availability distribution is independent of time. As those who are skilled in the art will appreciate, A(t) is normalized across multiple sessions by accounting for the total number of new and active sessions. For example, for the one new session and three active sessions, the intermediate result for A(t) is divided by four to determine its normalized value.

Continuing with the task execution, after task 605 is completed task execution proceeds to task 403.

Figure 7:
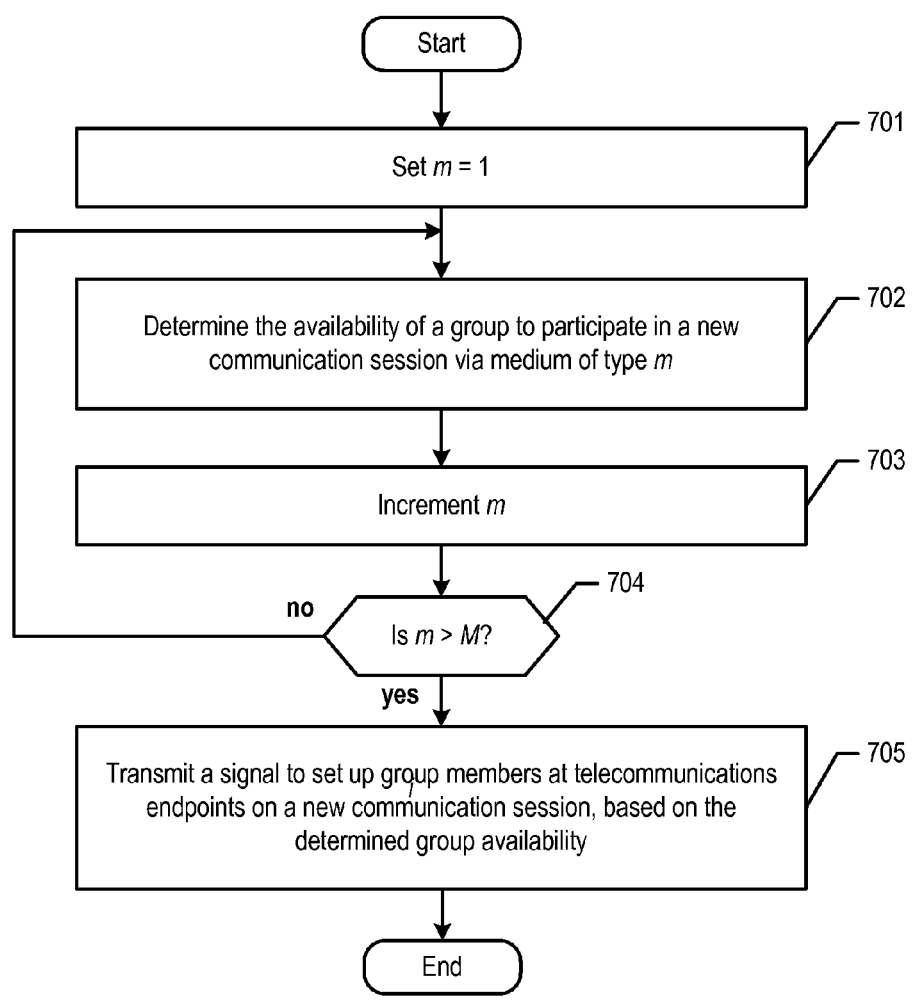
FIG. 7 depicts a flowchart diagram of the salient tasks performed by availability manager 204 in determining the availability of a group of users for a communication session of interest via one or more candidate media, in accordance with the illustrative embodiment of the present invention.
Figure 8:
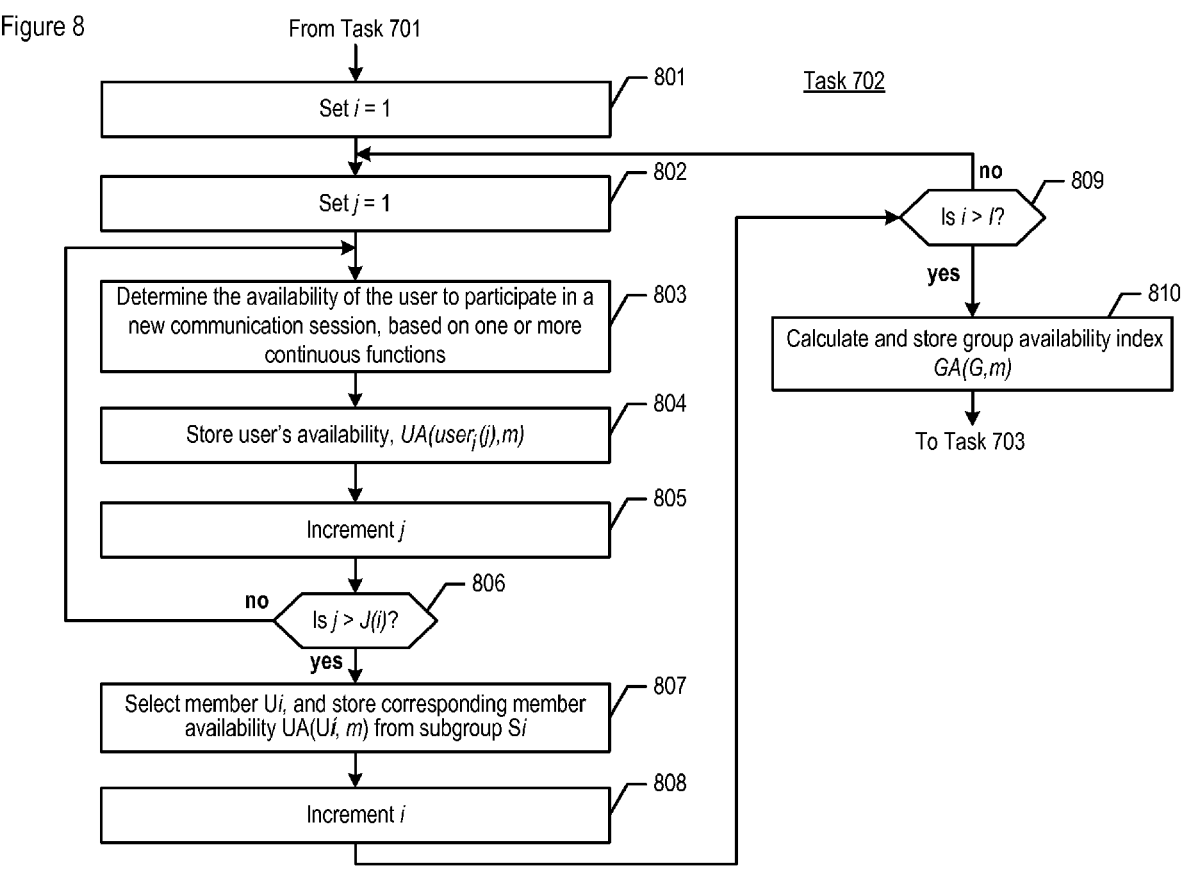
FIG. 8 depicts a flowchart diagram of the salient tasks performed by availability manager 204 in determining the availability of the group of users to participate in a communication session of interest via a particular medium.

FIGS. 7 and 8 depict flowchart diagrams of the salient tasks performed by availability manager 204 in determining the availability of a group of users for a communication session of interest (i.e., either a new or an existing session), in the process considering one or more candidate communication media. The group can be one that is ad hoc (e.g., a temporary task force, etc.) or one that was pre-existing (e.g., one that has been meeting on a regular basis, etc.). As those who are skilled in the art will appreciate, some of the events that appear in FIGS. 7 and 8 can occur in parallel or in a different order than that depicted. Furthermore, it will be clear to those skilled in the art, after reading this specification, how to apply the present invention towards determining other types of user group availability, such as the availability of a user group to perform one or more tasks, or to do other work.

In accordance with the illustrative embodiment, manager 204 calculates a group availability index in order to select the most appropriate medium for connecting an endpoint-user group. The user group itself might consist of a different mix of members for each communication medium being considered. In some alternative embodiments, the medium is fixed in advance, and the tasks described with respect to FIGS. 7 and 8 are instead used to select the people that have the highest availability on the fixed medium that is required for a communication session, such as a conference call. For pedagogical purposes, the group availability index that is determined in the illustrative embodiment is expressed in terms of a value between 0 and 10, where "0" signifies that availability is non-existent, "1" signifies the lowest, existing availability, and "10" signifies the highest availability. As those who are skilled in the art will appreciate, however, the group availability index can be expressed in terms of a different numeric range; furthermore, the availability in general of a group can be evaluated and expressed in terms of other scales, such as "between 0 and 1"; "none", "low", "medium", or "high"; and so forth.

For a given medium type m, the group availability index for a user group G: {U1, U2, . . . , UI} is defined as the weighted sum of the best availability using medium type m across all group members U1 through UI. Group member Ui can be selected from subgroup Si: {$user_i(1)$, $user_i(2)$, ..., $user_i(J(i))$}, where there might be one user or multiple users in a particular subgroup. Note that each value of m represents a different type of medium. For example, a value of 1 can represent the medium of voice, a value of 2 can represent the medium of instant messaging, and so forth. It will be clear to those skilled in the art how to assign different values for m to represent the different communication media being considered.

Referring to FIG. 7, at task 701, manager 204 sets index m equal to 1.

At task 702, manager 204 determines the group availability index for group G and with medium m under consideration, in accordance with the illustrative embodiment of the present invention. Task 702 is described in detail below and with respect to FIG. 8.

At task 703, manager 204 increments index m.

At task 704, manager 204 checks if index m is greater than the number of communication media being considered, M. If index m is not greater than M, task execution proceeds to task 702 for the purpose of determining the group availability for another medium. If index m is greater than M, task execution proceeds to task 705.

At task 705, manager 204 sets up the users in the identified user group on the communication session of interest on their telecommunications endpoints, based on the best availability out of all of the group availability indices calculated for all of the considered communication media. To set up the users, manager 204 transmits a signal to instruct call-processing server 203 to set up the corresponding endpoint on the communication session of interest on the medium that is associated with the best availability determined. In some alternative embodiments, manager 204 can directly transmit call setup instructions (e.g., a SIP INVITE, etc.) to the corresponding endpoints. It will be clear to those skilled in the art how to set up a communication session, once the determination has been made to set up the users on their endpoints and on a particular medium. Task execution then ends.

FIG. 8 depicts a flowchart diagram of the salient tasks performed by availability manager 204 in determining the availability of a user group to participate in a communication session of interest (i.e., either a new or an existing session) via a particular medium type m, in accordance with the illustrative embodiment of the present invention.

At task 801, manager 204 sets index i equal to 1.

At task 802, manager 204 sets index j equal to 1.

At task 803, manager 204 determines the availability of the user currently being evaluated, $user_i(j)$, to participate in a communication session of interest via the communication medium of type m. In accordance with the illustrative embodiment, manager 204 determines the user's availability based on one or more continuous functions as described earlier and with respect to task 402, as depicted in FIG. 6. In some alternative embodiments, manager 204 can determine the user's availability based on one or more discrete rules as described earlier and with respect to task 401, as depicted in FIG. 5.

At task 804, manager 204 stores the user availability for the user currently being evaluated, $UA(user_i(j), m)$.

At task 805, manager 204 increments index j.

At task 806, manager 204 checks if index j is greater than the number of users, J(i), in current subgroup Si. If index j is not greater than J(i), task execution proceeds to task 803. If index j is greater than J(i), task execution proceeds to task 807.

At task 807, manager 204 selects the particular user, $user_i$(j), from subgroup Si to be member Ui of user group G. In accordance with the illustrative embodiment, the member Ui is selected by determining which user in the subgroup has the best availability for the medium being considered. This is accomplished by determining the maximum value of $UA(user_i(j), m)$ across all users in the current subgroup and selecting the corresponding user. Manager 204 then stores member Ui's availability, $UA(Ui, m)$, for the medium under consideration.

As those who are skilled in the art will appreciate, in some alternative embodiments, more than one user from subgroup Si can be selected to be in user group G. For example, if k users are to be selected from subgroup Si to be in user group G, manager 204 can determine which users have the k best availabilities for the medium being considered. Alternatively, manager 204 can determine which users have an availability that exceeds a particular value and then selects all of those users to be in user group G.

At task 808, manager 204 increments index i.

At task 809, manager 204 checks if index i is greater than the number of members, I, in group G. If index i is not greater than I, task execution proceeds to task 802. If index i is greater than I, task execution proceeds to task 810.

At task 810, manager 204 calculates and stores the group availability index, GA(G,m), for group G and current medium type m. In accordance with the illustrative embodiment, GA(G,m) is expressed in terms of the following weighted sum equation:

$$GA(G, m) = \sum_i w(i) * UA(Ui, m), \text{ for } i \text{ from } 1 \text{ through } I \quad \text{(Eq. 3)}$$

where:
  i. i is the group member index;
  ii. I is the number of group members in group G;
  iii. m is the medium type under consideration; and
  iv. w(i) is the numeric weight that applies to group member i.

Each numeric weight, w(i), accounts for the fact that some group members, or roles, might be more important than others for participating in a communication session of interest. For example, if a group is being pulled together to discuss making a product development decision and there are five roles that need to be represented—systems engineering, software development, testing, product management, and project management—it might be extremely important to ensure that systems engineering and development are represented in the discussion; if this is the case, the numeric weights applied to the systems engineering and development roles will be greater than those applied to the other roles. If, however, all roles are equally important to be represented in the discussion, then the numeric weights are the same for all roles pertaining to the group.

As those who are skilled in the art will appreciate, each weight, w(i), can be based on one or more properties, including the nature of the group activity to be undertaken, the relative importance of each member or role being represented, and so forth. The weights can be determined empirically, analytically, or through other means, and can be specified by an application engineer, or other expert, who has intimate knowledge of the needs of the communication application. It will be clear to those skilled in the art, after reading this specification, how to determine numeric values for the weights.

After task 810, task execution then proceeds to task 703 for the purpose of evaluating another communication medium type, if another type is to be evaluated.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
    determining an availability of a user of a communication endpoint for participating in a communication session based on the value of a function $f(x)$,
    wherein x is the expected duration of the communication session, and
    wherein f is an exponential decay function and receiving a first indication that the user is participating on a first communication session.

2. The method of claim 1 wherein the availability is also based on the expected time remaining in the first communication session.

3. The method of claim 2 wherein the availability is based on the value of a function $g(f(x), y)$,
    wherein y is the expected time remaining of the first communication session, and
    wherein g is an exponential decay function.

4. The method of claim 3 wherein the availability is also based on
    the value of a function $h(f(x), g(y), z)$,
    wherein z is the expected time remaining in a second communications session involving the user, and
    wherein h is an exponential decay function.

5. The method of claim 1 further comprising receiving a second indication that the first communication session is occurring via a first medium, wherein the communication session also occurs via the first medium.

6. The method of claim 5 further comprising transmitting a first signal, based on the availability, to a data-processing system that is capable of setting up a first telecommunications endpoint on the communication session.

7. A method comprising:
    receiving a first indication that a user is participating in a first communication session; and
    determining an availability of the user of a communication endpoint for participating in a second communication session based on the value of a function $f(x)$,
    wherein x is the expected time remaining in the first communication session, and
    wherein f is an exponential decay function.

8. The method of claim 7 wherein the availability is also based a function $g(f(x),y)$,
    wherein y is the expected duration of the second communication session.

9. The method of claim 8 wherein the function, g, is an exponential decay function.

10. The method of claim 9 wherein the availability is also based on the value of a function $h(f(x), g(y), z)$,
    wherein z is the expected time remaining in a third communications session involving the user, and
    wherein h is an exponential decay function.

11. The method of claim 7 further comprising receiving a second indication that the first communication session is occurring via a first medium, wherein the second communication session also occurs via the first medium.

12. The method of claim 11 further comprising transmitting a first signal, based on the availability, to a data-processing system that is capable of setting up a first telecommunications endpoint that is associated with the user, on the second communication session.

13. A method comprising:
    receiving a first indication that a user of a communication endpoint is participating in a first communication session; and
    determining the availability of the user for participating in a second communication session, based on:
        i) a first function of the expected time remaining of the first communication session, and
        ii) a second function of the expected duration of the second communication session,
    wherein the first function and the second function are exponential decay functions.

14. The method of claim 13 wherein the availability is also based on:
    iii) a third function of the expected time remaining in a third communication session,
    wherein the third function is exponential decay function.

15. The method of claim 14 wherein the second function and the third function utilize different decay constants.

16. The method of claim 13 wherein the first function and the second function utilize different decay constants.

17. The method of claim 13 further comprising receiving a second indication that the first communication session is occurring via a first medium, wherein the second communication session also occurs via the first medium.

18. The method of claim 17 further comprising transmitting a first signal, based on the availability, to a data-processing system that is capable of setting up a first telecommunications endpoint that is associated with the user, on the communication session of interest.

* * * * *

UNITED STATES PATENT AND TRADEMARK OFFICE
CERTIFICATE OF CORRECTION

PATENT NO.      : 7,616,624 B2                                    Page 1 of 1
APPLICATION NO. : 11/458751
DATED           : November 10, 2009
INVENTOR(S)     : John et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 115 days.

Signed and Sealed this

Nineteenth Day of October, 2010

David J. Kappos
*Director of the United States Patent and Trademark Office*